United States Patent
Sørensen

(10) Patent No.: US 8,808,491 B2
(45) Date of Patent: Aug. 19, 2014

(54) METHOD AND APPARATUS FOR CUTTING OUT BALSA BLANKET PARTS

(75) Inventor: Gert Sørensen, Skanderborg (DK)

(73) Assignee: LM Glasfiber A/S, Kolding (DK)

( * ) Notice: Subject to any disclaimer, the term of this patent is extended or adjusted under 35 U.S.C. 154(b) by 245 days.

(21) Appl. No.: 13/259,752

(22) PCT Filed: Mar. 26, 2010

(86) PCT No.: PCT/DK2010/050070
§ 371 (c)(1),
(2), (4) Date: Sep. 23, 2011

(87) PCT Pub. No.: WO2010/108497
PCT Pub. Date: Sep. 30, 2010

(65) Prior Publication Data
US 2012/0024122 A1   Feb. 2, 2012

(30) Foreign Application Priority Data

Mar. 27, 2009 (DK) .................................. 2009 00424

(51) Int. Cl.
*B32B 37/02* (2006.01)
*B27D 1/10* (2006.01)
*B63B 5/02* (2006.01)
*B32B 21/04* (2006.01)
*B32B 21/13* (2006.01)
*B32B 21/14* (2006.01)

(52) U.S. Cl.
USPC ........... 156/265; 156/266; 156/270; 156/303; 156/306.6; 144/346; 144/350; 144/351; 144/355; 144/363

(58) Field of Classification Search
CPC .... B32B 37/02; B32B 38/0004; B32B 21/04; B32B 21/13; B32B 21/14; B32B 2250/002; F03D 1/0675; Y02E 10/721; B27D 1/10; F03B 3/121; F03B 3/123; B63B 5/02; B27M 3/00
USPC ......... 156/256, 265, 266, 267, 270, 182, 303, 156/306.6; 144/346, 350, 351, 355, 363
See application file for complete search history.

(56) References Cited

U.S. PATENT DOCUMENTS 1,646,645 A * 10/1927 Frederickson et al. ......... 221/93
3,376,185 A   4/1968 Shook et al.
(Continued)

FOREIGN PATENT DOCUMENTS

| DE | 90 11 185 U1 | 10/1990 |
| EP | 0 403 024 A1 | 12/1990 |
| GB | 1 439 578 A  | 6/1976  |

*Primary Examiner* — Linda L Gray
(74) *Attorney, Agent, or Firm* — Nath, Goldberg & Meyer; Jerald L. Meyer; Sanjana Mangalagiri

(57) ABSTRACT

Method and apparatus for cutting out balsa blanket parts comprising the following steps: providing on a surface of a conveyor (12) a row of balsa blankets (1) abutting each other end edge to end edge in butt areas at the joining stations (14.1-14.5); interjoining the balsa blankets (1) in the butt areas at the joining stations (14.1-14.5) to form a balsa blanket web; feeding the balsa blanket web in a direction of feed (F) to a cutting station (15) where the balsa blanket web is stepwise conveyed and cut through crosswise at positions to form the desired parts; providing a next row of balsa blankets on the surface of the conveyor when the rearmost end edge on the rearmost blanket of the balsa blanket web is at the last joining station (14.5), said blankets of the next row abutting each other end edge (4) to end edge (5) and the leading end edge of the foremost balsa blanket in the next row of balsa blankets abutting the rearmost end edge of the rearmost balsa blanket in the balsa blanket web; at the joining stations (14.1-14.5) interjoining the next row of the balsa blankets and joining it with the balsa blanket web in the butt areas.

7 Claims, 4 Drawing Sheets

(56) References Cited

U.S. PATENT DOCUMENTS

Figure 1:
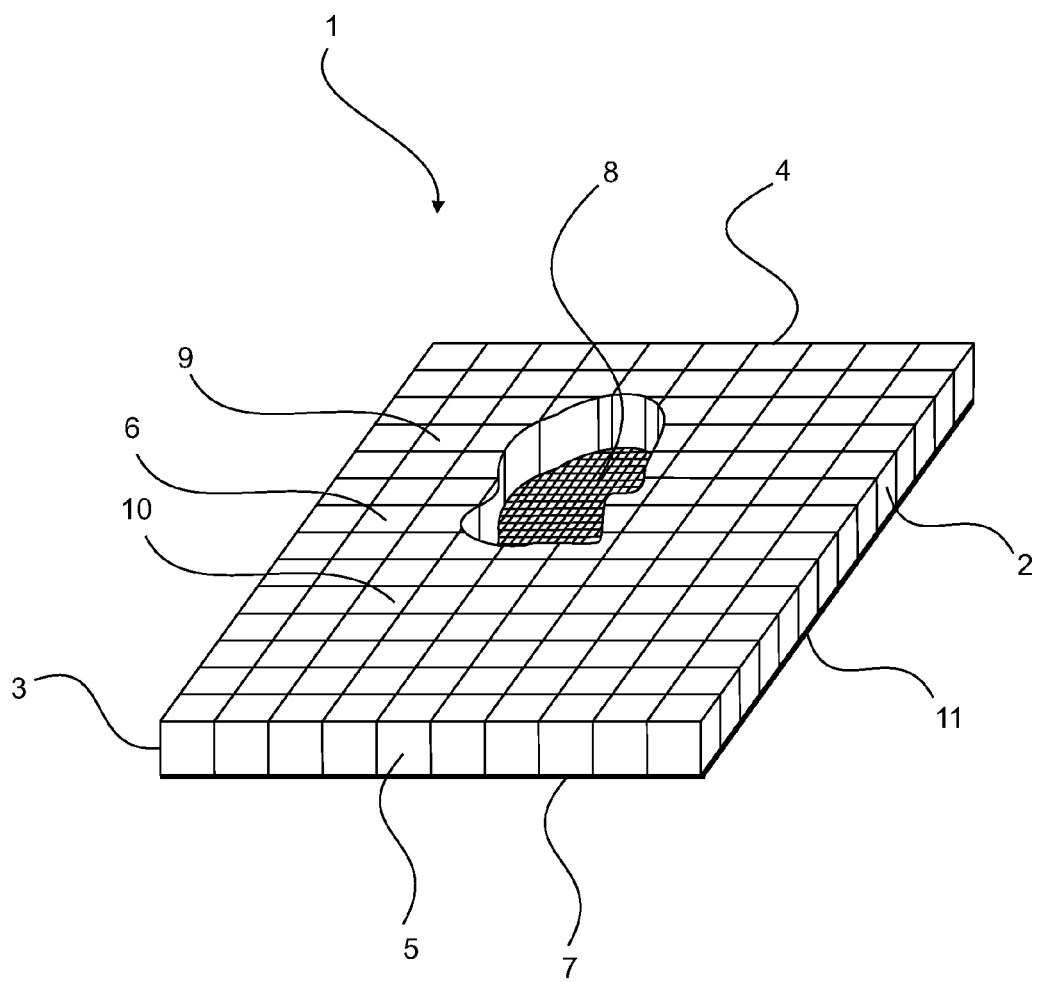

| | | |
|---|---|---|
| 3,540,967 A | 11/1970 | Shook et al. |
| 3,878,020 A * | 4/1975 | Huffaker et al. ............. 156/291 |
| 3,909,342 A * | 9/1975 | Shook ........................... 156/522 |
| 4,122,878 A | 10/1978 | Kohn |
| 6,811,647 B1 | 11/2004 | Graf et al. |

* cited by examiner

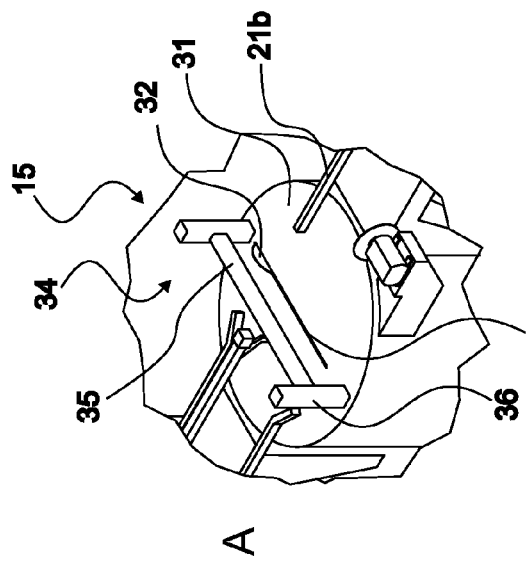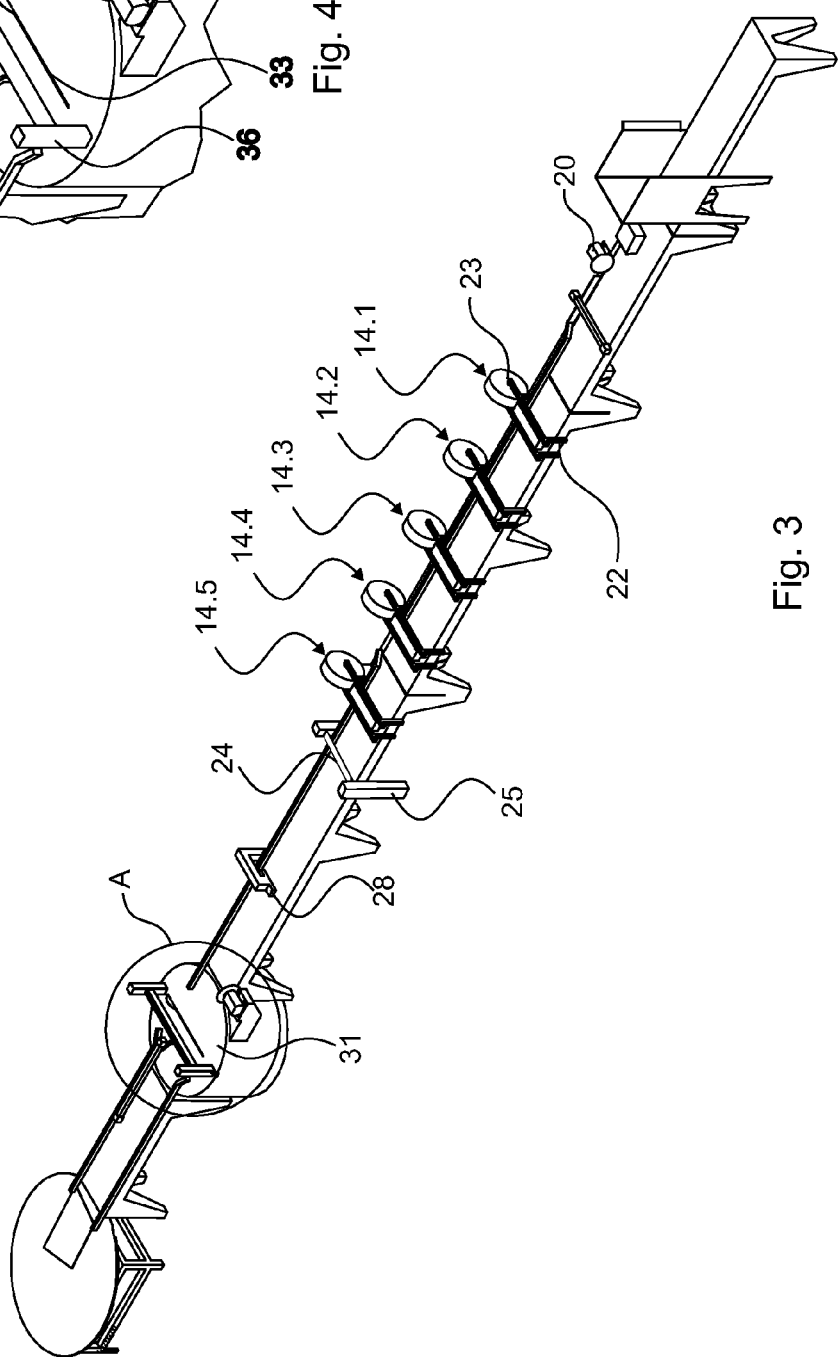

METHOD AND APPARATUS FOR CUTTING OUT BALSA BLANKET PARTS

This is a National Phase Application filed under 35 U.S.C. 371 as a national stage of PCT/DK2010/050070, with the filing date of Mar. 26, 2010, an application claiming the benefit from the Danish Application No. PA 2009 00424, filed on Mar. 27, 2009, the entire content of each of which is hereby incorporated by reference in its entirety.

TECHNICAL FIELD

The present invention relates to a method for cutting balsa blanket parts, said balsa blankets having a rectangular shape with two parallel side edges and two parallel end edges and an upper surface and a lower surface parallel thereto and comprising a flexible carrier layer preferably having a mesh-like structure, especially a fibreglass mesh, a plurality of closely adjacent or abutting balsa blocks being secured to one face thereof and the other face thereof forming the lower face of the balsa blanket.

BACKGROUND

Balsa blankets and/or parts cut out of balsa blankets are laminated to a great extent into shell structures of fibre-reinforced plastics, e.g. epoxy and fibre glass, due to their high compressive strength and rigidity in relation to weight. Balsa blankets are used in great amounts in large shell structures, such as boat hulls or fibre-glass blades. Balsa blankets are sold in standard sizes, e.g. about 0.6 m×1.2 m, from which the parts needed for the shell structure are cut. This cutting process results in a relatively large waste of material, especially when cutting out non-rectangular parts. An example of balsa blankets is the balsa blanket BALTEK®SB, Structural End-Graen Balsa from Alkan Composites Ltd.

DISCLOSURE OF THE INVENTION

The object of the invention is to reduce or minimize the waste when cutting out balsa blanket parts and to provide an effective apparatus for cutting out balsa parts.

The method according to the invention is characterised by the following steps:

a—providing on a surface of a conveyor a row of balsa blankets abutting each other end edge to end edge in butt areas at the joining stations and having aligned side edges;

b—interjoining the balsa blankets (1) in the butt areas at the joining stations to form a balsa blanket web;

c—feeding the balsa blanket web in a direction of feed (F) to a cutting station where the balsa blanket web is stepwise conveyed and cut through crosswise at positions to form the desired parts;

d—providing a next row of balsa blankets on the surface of the conveyor when the rearmost end edge on the rearmost blanket of the balsa blanket web is at the last joining station, said blankets of the next row abutting each other end edge to end edge and the leading end edge of the foremost balsa blanket in the next row of balsa blankets abutting the rearmost end edge of the rearmost balsa blanket in the balsa blanket web, and e—at the joining stations interjoining the next row of the balsa blankets and joining it with the balsa blanket web in the butt areas.

By the method according to the invention a first balsa blanket web is thus formed of the balsa blankets and subsequently joined with an additional balsa blanket web formed of interconnected balsa blankets. The subsequent balsa blanket web may be joined with an additional balsa blanket web formed of balsa blankets, and thus in principle a continuous balsa blanket web can be provided, from the leading end of which required parts can be cut. The parts may thus consist of parts of two interconnected balsa blankets, whereby the waste is reduced considerably compared to the waste occurring when cutting out parts of separate balsa blankets. Waste reduction is particularly important in large shell structures, e.g. in wind turbine blades formed of two shell halves, and wherein a very large number of balsa blanket parts are laminated into each shell half, said blanket parts mutually abutting essentially from the blade root to the blade tip.

To further promote the understanding of the savings obtained by method according to the invention it should be noted that the mutually abutting edges of the balsa parts and the edges of the balsa parts extending in the longitudinal direction of the blade, and which often form a small angle with the mutually abutting edges, are produced by cutting the balsa blanket, whereby the rest thereof is waste material. This waste of material does not occur or is reduced significantly by the method according to the invention, as the parts are cut from a web and the edges formed by the transverse cutting out of the parts are the edges extending substantially in the longitudinal direction of the blade, when the parts form part of the blade shell.

It should further be noted that the conveyor may be any type of conveyor along which the balsa blankets can be advanced, such as a belt conveyor or a roller conveyor or merely a smooth base.

The balsa blankets may advantageously be substantially identical.

Furthermore, according to an embodiment of the invention the row of blankets may be provided in step a by conveying the balsa blankets along the surface of the conveyor in succession and with their side edges abutting a guide, the conveyance of the foremost balsa blanket being stopped when its rearmost end edge reaches the last joining station, and the conveyance of the succeeding balsa blankets being stopped when the foremost end edge thereof abuts the rearmost end edge of the balsa blanket in front thereof to form the butt area at the corresponding joining station.

Moreover according to the invention the next row of blankets may be provided in step d by conveying the balsa blankets along the surface of the conveyor in succession and with one of their side edges abutting a guide, the conveyance of the foremost balsa blanket being stopped when its foremost end edge abuts the rearmost end edge of the rearmost balsa blanket at the last joining station and the conveyance of the succeeding balsa blankets being stopped when the foremost end edge thereof abuts the rearmost end edge of the balsa blanket in front thereof to form the butt area at the corresponding joining station.

The balsa blankets are advantageously advanced with the lower surface facing upwards and thus away from the conveyor such that their carrier layer faces upwards.

Further, according to the invention, the one side edge of the balsa blankets may be trimmed before being brought into abutment with the guide. Since the supplied balsa blankets sometimes have not quite smooth or even edges, it may be advantageous to perform the said trimming for an optimum guidance of the feeding of the balsa blankets.

A trimming of the other side edge of the balsa blankets may also be carried out before reaching the cutting station so as to obtain a well-defined second side edge and complete alignment of the two side edges of the balsa blankets.

According to the invention, the balsa blankets at the butt areas at the joining stations may be interconnected by means of a transverse flexible strip preferably being adhesively secured to preferably the lower surface of the abutting balsa blankets such that it extends onto both balsa blankets.

Moreover, according to the invention the strip may be adhesively secured to the lower surface of the balsa blankets by means of a heat-activatable adhesive (hot melt) preferably being pre-applied to the strip.

According to an embodiment several identical parts are cut in succession in the cutting station. These parts may be cut out with an oblique cut in relation to the direction of feed of the balsa blanket web, whereby identical parts are formed, which are turned 180° in relation to each other.

In principle, the strip may be of any type of flexible material, but preferably has a mesh-like structure and may especially be a fibre-glass strip with a mesh-like structure.

The mutually abutting balsa webs may of course also be interconnected in a manner differing from the manner stated above. As an example, the mutually abutting end edges of the balsa blankets may be joined directly by glueing.

The stepwise conveyance of the balsa blanket web to the cutting station may be carried out by means of a gripping device being forwards and backwards moveable along the conveyor and having an engagement means for engaging the surface of the balsa blanket web.

The invention further relates to an apparatus for cutting out substantially identical balsa blanket parts, said apparatus being characterised in that it comprises:
- a conveyor, preferably a belt conveyor having a surface for conveying balsa blankets arranged thereon in a direction of feed (F),
- a loading station for loading balsa blankets to the surface of the conveyor (12) at a front end thereof,
- a guide rail arranged along one side of the conveyor,
- a number of joining stations arranged after the loading station and having a mutual interspacing substantially corresponding to the length of the balsa blankets, and being adapted to join conveyed and abutting balsa blankets in butt areas therebetween, and
- a cutting station arranged after the rearmost joining station and comprising a table turnably arranged about an axis being perpendicular to the surface of the conveyor and a cutting device, especially a circular saw, connected to the table and being linearly displaceable across the table.

Furthermore, according to the invention a gripping device may be provided between the last joining station and the cutting station, said gripping device being forwards and backwards moveable along the conveyor and having an engagement means for engaging a balsa blanket to retain or advance said blanket.

Moreover, according to the invention, a stop may be arranged after the rearmost joining station at a distance thereto corresponding to the length of a balsa blanket, said stop being displaceably arranged, preferably perpendicular to the surface of the conveyor, between an engagement position in which it engages the foremost edge of a balsa blanket and a release position in which it disengages conveyed balsa blankets.

According to the invention, a first trimming device, such as a circular saw, may be arranged in front of the foremost end of the guide rail for trimming one side edge of a conveyed balsa blanket.

Further, a second trimming device, such as a circular saw, may be arranged between the last joining station and the cutting station for trimming the second side edge of the balsa blankets.

Finally, the cutting station may comprise a pressure device arranged adjacent the circular saw for forcing the balsa blanket web into abutment with the table during cutting. The pressure device may comprise a transverse bar being upwardly and downwardly movable along vertical guides between a pressure position and a release position.

BRIEF DESCRIPTION OF THE DRAWING(S)

Figure 2:
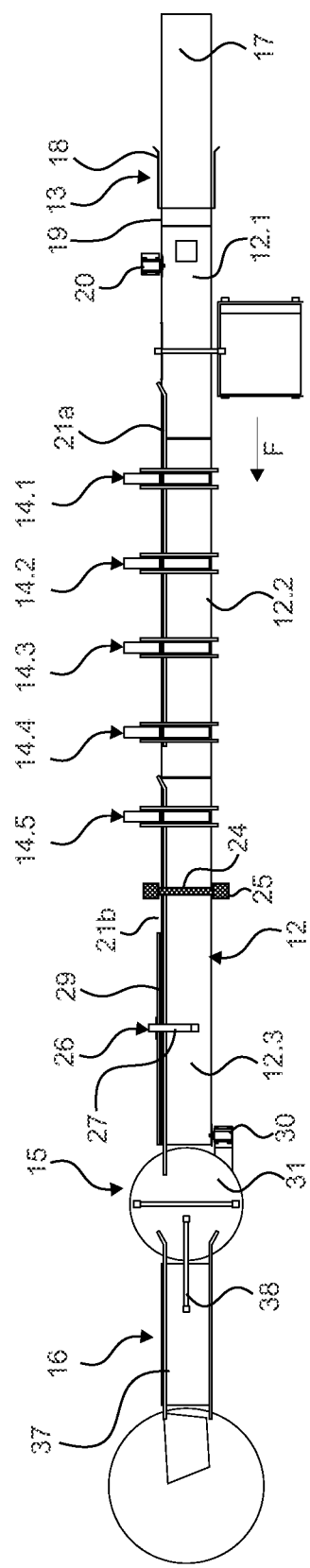
Figure 5:
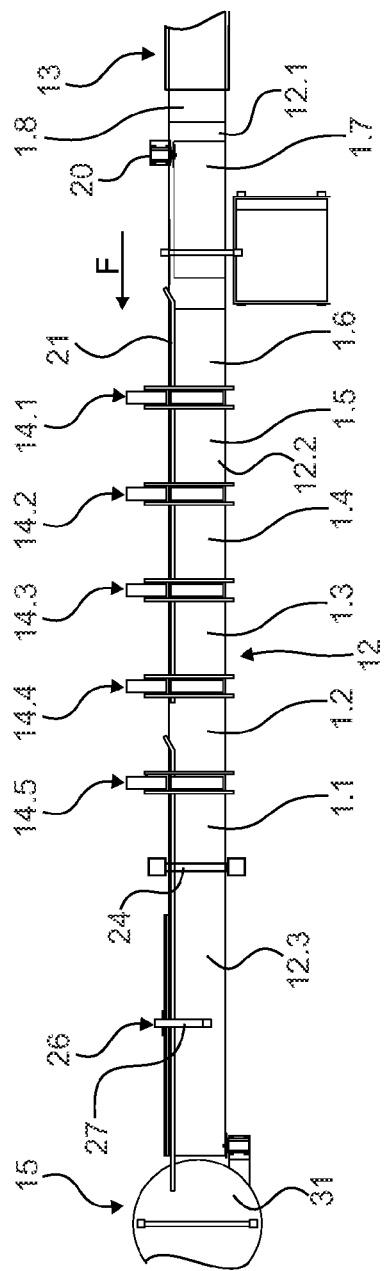
Figure 6:
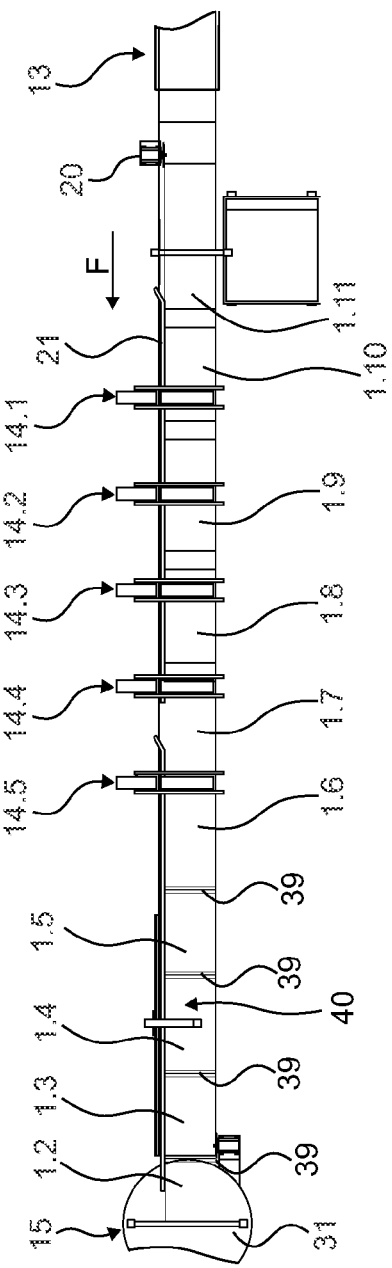

The invention is explained in detail below with reference to the drawing(s), in which FIG. 1 shows a balsa blanket, FIG. 2 is a schematic upper view of an apparatus according to the invention for carrying out the method according to the invention, FIG. 3 is a schematic perspective view of the apparatus according FIG. 1, FIG. 4 shows the detail A in FIG. 3 on an enlarged scale, FIG. 5 is a sectional view of FIG. 1 at the formation of a first balsa blanket web, and FIG. 6 is a sectional view of FIG. 2, wherein the first balsa blanket web has been formed and conveyed, and a subsequent balsa blanket web is being formed.

DETAILED DESCRIPTION OF THE INVENTION

FIG. 1 shows a balsa blanket 1, which has a rectangular shape with two parallel side edges 2, 3 and two parallel end edges 4, 5 and an upper surface 6 and parallel thereto a lower surface 7. The balsa blanket 1 comprises a carrier layer 8 in form of a fibre-glass mesh, a plurality of abutting balsa blocks 9 being secured to one face thereof, which is visible in section in FIG. 1. The surface of the balsa blocks 9 visible in Figure form the upper surface 10 of the balsa blanket web, while the other side of the fibre-glass mesh forms the lower surface 11 of the balsa blanket.

The embodiment shown in FIGS. 1-6 of an apparatus according to the invention comprises a belt conveyor 12 comprising three aligned successive belt conveyor sections 12.1 to 12.3, a loading station 13 arranged at the front end of the belt conveyor 12, five joining stations 14.1-14.5 and a cutting station 15 arranged at the rear end of the belt conveyor 12. Finally, a part unloading station 16 is provided after the cutting station.

The loading station 13 comprises an additional belt conveyor 17 adapted to receive a stack of not-shown balsa blankets, the lower surface 11 thereof, i.e. the surface formed of the fibreglass mesh 8, facing upwards. A shield 18, which is adapted to partly circumscribe the stack of balsa blankets, has a front wall 19 ending at a distance from the surface of the conveyor belt of the additional belt conveyor 17, said distance slightly exceeding the thickness of the balsa blankets. As a result, during operation of the additional belt conveyor 17, the lowermost balsa blanket in the stack is loaded from the loading station onto the front section 12.1 of the belt conveyor 12. A first trimming device in form of a circular saw 20 is arranged at one side edge of the belt conveyor section 12.1.

A guide rail 21 extends along said side of the belt conveyor 12 with its front end arranged immediately after the first trimming device 20. The guide rail 21 extends into the cutting station 15. It should be noted that the guide rail 21 is made of two sections 21*a* and 21*b*.

The second belt conveyor section 12.2 extends from the first belt conveyor section 12.1 through the four first joining stations 14.1-14.4 when seen in the direction of feed F, while the last joining station 14.5 is arranged in the front area of the third belt conveyor section 12.3. The joining stations 14.1-

14.5 are spaced apart at a distance substantially corresponding to the length of a balsa blanket, i.e. the distance between the end edges 4 and 5.

Each joining station has a frame 22 extending across the conveyor of the belt conveyor 12 and provided with a roll support supporting a roll 23 of a strip of fibreglass mesh with a heat-activatable adhesive. The joining stations 14.1-14.5 are each further provided with a gripping device adapted to grip the fibreglass strip and move it across the conveyor, and a heating plate being vertically displaceable between a position in which it engages the fibreglass strip and causes it to engage a subjacent balsa blanket web, and a position in which the heating plate disengages the fibreglass strip. After the last joining station and at a distance therefrom substantially corresponding to the length of a balsa blanket, a stop 24 in form of a stop bar is arranged. Along vertical guides 25, the stop 24 can be moved upwards and downwards between a position in which it is closer to the upper surface of the third belt conveyor than the thickness of a balsa blanket, and a position in which it is arranged at a distance from the conveyor being greater than the said thickness.

Between the last joining station 14.5 and the cutting station 15 a gripping device 26 with a gripping arm 27 is arranged. The arm 27 extends across the conveyor and is provided with a gripping means being movable in upward and downward direction so as to engage and disengage a balsa blanket web arranged on the conveyor. Along a guide rail arranged along one side of the belt conveyor section 12.3, the gripping arm 27 can be moved forwards and backwards along the belt conveyor section 12.3.

A second trimming device in form of a circular saw is arranged at the rearmost end of the belt conveyor section 12.3.

The cutting station 15, which is arranged after the belt conveyor 12, comprises a circular table 31 turnably arranged about an axis being perpendicular to the surface of the belt conveyor. Under the table 31a cutting device in form of a circular saw is arranged, said device having a blade 32 extending up through a transverse slot 33 in the table 31. The circular saw is linearly displaceably connected to the table such that the blade 32 can be displaced along the slot 33. On the table 31 adjacent the slot 33 a pressure device 34 is arranged, said device comprising a transverse pressure bar 35, which can be moved downwards and upwards along vertical guides 36 for pressing against a balsa blanket web during cutting thereof and for disengaging the web.

The part unloading station 16 comprises a third belt conveyor 37 arranged in extension of the cutting station 15 and a gripping device 38 adapted to remove a cut part from the table 31 and convey it onto the third belt conveyor 37 by means of which it is led out of the apparatus.

An embodiment of the method according to the invention is described in detail below with reference to the embodiment shown in FIGS. 2-6 of the apparatus according to the invention.

By activating of the belt conveyor 17 of the loading station, balsa blankets 1 are loaded in succession from a stack of balsa blankets arranged in the loading station 13 onto the front conveyor section 12.1 moving them forward. When the blankets reach the first trimming device 20, one side edge 2 is trimmed, whereupon they are moved forward onto the second belt conveyor section 12.2 and under the joining stations 14.1-14.5. When being moved forward and after having passed the first trimming device, the balsa blankets are guided along their side edges 2 by the guide rail 21 and made to press thereagainst by pressure means (not shown). The stop 24 is in its lower engagement position and stops the forward movement of the leading balsa blanket 1.1. The forward movement of the succeeding balsa blankets is stopped when the leading end edge thereof abuts the rearmost end edge of the balsa blanket in front thereof. As a result, a row of balsa blankets is formed, said blankets abutting each other end edge to end edge in butt areas at the joining stations 14.1-14.5. In the present example, the row of balsa blankets consists of six balsa blankets 1.1-1.6. The joining stations 14.1-14.5 are then activated, whereby in each joining station a strip 39 of fibreglass mesh is secured to the balsa blankets in the butt areas and extends onto both the abutting balsa blankets. As evident from FIG. 6, the strip 39 extends over the width of the balsa blankets between the side edges and is cut off at the side edges.

A first balsa blanket web 40 is thus formed, said web consisting of balsa blankets being interconnected by means of the strips 39. By activating the second belt conveyor 12.2 and the third belt conveyor section 12.3, the balsa blanket web 40 is moved onto the latter, confer FIG. 6. When the formed balsa blanket web 40 has been moved a distance onto the third belt conveyor section 12.3, the web is stopped and the gripping device 26 is moved back to its rearmost position and made to engage the balsa blanket web. The balsa blanket web is then moved into the cutting station 15 by moving the gripping arm 27 forward along the guide rail 29. The cutting of parts is initiated by stepwise moving the gripping device a distance forward corresponding to the length of the part to be cut. The table 31 has been turned in advance to the desired angle of the slot 33 in relation to the guide rail 21, and a cut is made by moving the circular saw and thus the blade 32 thereof along the slot 33. The conveyance and cutting out of parts from the balsa blanket web continues until a sensor (not shown) arranged between the fourth and fifth joining station 14.4, 14.5 senses the rearmost edge of the balsa blanket web, whereafter the gripping arm 27 moves the rearmost edge of the balsa blanket web 40 forward to a position being spaced apart from the last joining station 14.5 at a distance corresponding to the length of a balsa blanket web. In this position, the stop bar 24 is moved to engage the upwardly facing surface of the balsa blanket web so as to retain the latter.

Additional balsa blankets 1.7-1.11 are then loaded from the loading station 13, in the present example five balsa blankets 1.7-1.11. One side edge of the blankets is trimmed by means of the first trimming device 20 and moved forward until the leading end edge of the leading balsa blanket 1.7 abuts the rearmost end edge on the rearmost balsa blanket 1.6 in the first balsa blanket web 40, and the leading end edge of the successive balsa blankets 1.8-1.11 abut the rearmost end edge of the balsa blanket in front thereof. As result, a next row of balsa blankets is formed, said blankets abutting each other end edge to end edge in butt areas at the joining stations 14.1-14.5. In the described example, the next row of balsa blankets comprises five balsa blankets 1.7-1.11. The joining stations 14.1-14.5 are then activated, whereby the abutting balsa blankets are joined together by securing a strip of fibreglass mesh extending onto both abutting balsa blankets to the upwardly facing surfaces thereof. In this connection it should be noted that in the last joining station 14.5 the rearmost balsa blanket 1.6 of the previously formed balsa blanket web 40 is joined with the leading balsa blanket 1.7 of the next balsa row by means of the strip of fibreglass mesh which is secured to the balsa blankets in the last joining station 14.5. The next balsa blanket web is thus formed and joined with the preceding balsa blanket web 40. The stop bar 24 is then raised and the advance of the balsa web to the cutting station 15 and thus the cutting out of parts therefrom can continue. It should be noted that before the stop bar 15 is raised, the gripping arm 27 is made to disengage the balsa blanket web and reverts to its first position, i.e. the position closest to the last joining station 14.5.

Finally, it should be noted that the second side edge of the balsa blankets forming part of the balsa blanket webs is trimmed by means of a second trimming device 30.

By continuing as described above in relation to the next balsa web, a balsa blanket web may be formed having a length corresponding to the ongoing production of balsa blanket parts. In principle, a continuous web of interconnected and abutting balsa blankets may be formed.

LIST OF REFERENCE NUMERALS

1 Balsa blanket
1.1 Leading balsa blanket in the first row of balsa blankets
1.2-1.6 Succeeding blankets
1.7 Leading balsa blanket in the next row of balsa blankets
1.8-1.11 Succeeding balsa blankets
2, 3 Side edges
4, 5 End edges
6 Upper surface
7 Lower surface
8 Carrier layer
9 Balsa blocks
10 Upper surface
11 Lower surface
12 Belt conveyor
12.1 First belt conveyor section
12.2 Second belt conveyor section
12.3 Third belt conveyor section
13 Loading station
13 Joining stations
14.1 First joining station
14.2 Second joining station
14.3 Third joining station
14.4 Fourth joining station
14.5 Fifth (last) joining station
15 Cutting station
16 Balsa part unloading station
17 Additional belt conveyor
F Direction of feed
18 Shield
19 Front wall
20 First trimming device
21 Guide rail
22 Frame
23 Roll
24 Stop
25 Vertical guide
26 Gripping device
27 Gripping arm
28 Gripping means
29 Guide rail
30 Second trimming device
31 Table
32 Blade
33 Slot
34 Pressure device
35 Pressure bar
36 Vertical guide
37 Third belt conveyor
38 Gripping device
39 Strip
40 First balsa blanket web

The invention claimed is:

1. Method for cutting out parts of balsa blankets, said balsa blankets (1) having a rectangular shape with two parallel side edges (2, 3), two parallel end edges (4, 5), an upper surface (10), and a lower surface (11) parallel thereto and comprising a flexible carrier layer (8), a plurality of closely adjacent or abutting balsa blocks (9) being secured to one face of the flexible carrier layer and an other face thereof forming the lower surface of the balsa blanket, characterised by the following steps:

a—providing on a surface of a conveyor (12) a row of balsa blankets (1) abutting each other end edge to end edge in butt areas at joining stations (14.1-14.5) and having aligned side edges (2, 3);

b—interjoining the balsa blankets (1) in the butt areas at the joining stations (14.1-14.5) to form a first balsa blanket web;

c—feeding the first balsa blanket web in a direction of feed (F) to a cutting station (15) where the first balsa blanket web is stepwise conveyed and cut through crosswise at positions to form the desired parts;

d—providing a next row of balsa blankets on the surface of the conveyor when a rearmost end edge on a rearmost blanket of the first balsa blanket web is at a last joining station (14.5), said blankets of the next row abutting each other end edge (4) to end edge (5) and a leading end edge of a foremost balsa blanket in the next row of balsa blankets abutting the rearmost end edge of the rearmost balsa blanket in the first balsa blanket web, and e—at the joining stations (14.1-14.5) interjoining the next row of the balsa blankets to form a next balsa blanket web and joining the next balsa blanket web with the first balsa blanket web in a butt area at the rearmost end edge of the rearmost blade blanket in the first balsa blanket web and the leading end edge of the foremost balsa blanket in the next balsa blanket web.

2. Method according to claim 1, wherein the row of blankets is provided in step a by conveying the balsa blankets along the surface of the conveyor (12) in succession and with their side edges abutting a guide (21), the conveyance of a foremost balsa blanket being stopped when its rearmost end edge reaches a last joining station (14.5), and the conveyance of the succeeding balsa blankets being stopped when a foremost end edge thereof abuts a rearmost end edge of the balsa blanket in front there-of to form a butt area at a corresponding joining station (14.4-14.1).

3. Method according to claim 1, wherein the next row of blankets is provided in step d by conveying the balsa blankets along the surface of the conveyor (12) in succession and with one of their side edges abutting a guide (21), the conveyance of a foremost balsa blanket being stopped when its foremost end edge abuts a rearmost end edge of the rearmost balsa blanket in the first balsa blanket web at a last joining station (14.5) and the conveyance of the succeeding balsa blankets being stopped when a foremost end edge thereof abuts a rearmost end edge of the balsa blanket in front thereof to form a butt area at a corresponding joining station (14.4-14.1).

4. Method according to claim 1, characterised in that a side edge of a balsa blankets is trimmed before being brought into abutment with a guide.

5. Method according to claim 1, wherein balsa blankets at butt areas at joining stations (14.1-14.5) are interconnected by means of a transverse flexible strip.

6. Method according to claim 5, characterised in that the strip is adhesively secured to the lower surface of the balsa blankets by means of a heat-activatable adhesive.

7. Method according to claim 2, wherein the next row of blankets is provided in step d by conveying the balsa blankets along the surface of the conveyor (12) in succession and with one of their side edges abutting a guide (21), the conveyance of a foremost balsa blanket being stopped when its foremost end edge abuts a rearmost end edge of the rearmost balsa blanket in the first balsa blanket web at a last joining station (14.5) and the conveyance of the succeeding balsa blankets of the next row of blankets being stopped when a foremost end edge thereof abuts a rearmost end edge of the balsa blanket in front thereof to form a butt area at a corresponding joining station (14.4-14.1).

\* \* \* \* \*